United States Patent
Yuan et al.

(10) Patent No.: US 10,025,988 B2
(45) Date of Patent: Jul. 17, 2018

(54) ANOMALOUS PIXEL DETECTION

(71) Applicant: Tektronix, Inc., Beaverton, OR (US)

(72) Inventors: Jie Yuan, Tulsa, OK (US); Onkar Nath Tiwari, Bangalore (IN); Arvind Nayak, Bangalore (IN); G. V. Varaprasad, Bangalore (IN)

(73) Assignee: Tektronix, Inc., Beaverton, OR (US)

( * ) Notice: Subject to any disclaimer, the term of this patent is extended or adjusted under 35 U.S.C. 154(b) by 317 days.

(21) Appl. No.: 14/847,972

(22) Filed: Sep. 8, 2015

(65) Prior Publication Data

US 2016/0342843 A1  Nov. 24, 2016

Related U.S. Application Data (60) Provisional application No. 62/174,400, filed on Jun. 11, 2015.

(30) Foreign Application Priority Data

May 22, 2015  (IN) .......................... 2011/MUM/2015

(51) Int. Cl.
 *G06K 9/00* (2006.01)
 *G06K 9/52* (2006.01)
 (Continued)

(52) U.S. Cl.
 CPC ....... *G06K 9/00744* (2013.01); *G06K 9/4652* (2013.01); *G06K 9/4671* (2013.01);
 (Continued)

(58) Field of Classification Search
 CPC ............. G06K 9/00744; G06K 9/4652; G06K 9/4671; G06K 9/52; G06K 9/6267;
 (Continued)

(56) References Cited

U.S. PATENT DOCUMENTS

| | | | |
|---|---|---|---|
| 5,854,655 A * | 12/1998 | Watanabe | H04N 5/367 348/247 |
| 7,061,533 B1 | 6/2006 | Urushiya | |
| 8,149,305 B2 * | 4/2012 | Shin | H04N 5/3675 348/246 |
| 8,774,544 B1 | 7/2014 | Szedo et al. | |

(Continued)

FOREIGN PATENT DOCUMENTS

WO   2007036055 A1   4/2007

OTHER PUBLICATIONS

Partial European Search Report issued in European Patent Application No. 16170734.4, dated Nov. 2, 2016, 6 pages.

(Continued)

*Primary Examiner* — Jonathan S Lee
(74) *Attorney, Agent, or Firm* — Marger Johnson; Andrew J. Harrington (57) ABSTRACT

A video noise analyzer for detecting residual point noise in a video generates a list of candidate defective pixels by joining results of a temporal invariance detector and a spatial outlier detector. A data store is structured to contain data describing the candidate defective pixels and/or the blocks from which the pixels were selected. In other embodiments, a video noise analyzer includes a first salient analyzer structured to compare pixels within a block to a mean value of other pixels within the same block, a first threshold processor to generate a first pixel candidate list including pixels that differ significantly from their neighboring pixels, a second salient analyzer structured to generate a difference value between a subject pixel, its neighboring pixels, and neighbors of the neighboring pixels, and an identifier to label as a candidate dead pixel those pixels having a frequency occurrence of visual saliency greater than a predefined frequency threshold.

20 Claims, 9 Drawing Sheets

(51) Int. Cl.
*G06K 9/62* (2006.01)
*G06K 9/46* (2006.01)
*G06T 7/00* (2017.01)

(52) U.S. Cl.
CPC ............ *G06K 9/52* (2013.01); *G06K 9/6267* (2013.01); *G06T 7/0002* (2013.01); *G06T 2207/10016* (2013.01); *G06T 2207/20021* (2013.01); *G06T 2207/20032* (2013.01); *G06T 2207/30168* (2013.01)

(58) Field of Classification Search
CPC ...................... G06K 7/20; G06K 7/408; G06T 2207/20021; G06T 2207/20032; G06T 2207/30168
See application file for complete search history.

(56) References Cited

U.S. PATENT DOCUMENTS

| | | | |
|---|---|---|---|
| 2002/0196354 A1* | 12/2002 | Chang | H04N 5/20 348/243 |
| 2008/0239114 A1* | 10/2008 | Shin | H04N 5/3675 348/246 |
| 2010/0141810 A1* | 6/2010 | Wang | H04N 5/3675 348/246 |
| 2017/0180722 A1* | 6/2017 | Manbeck | H04N 17/002 |

OTHER PUBLICATIONS

European Search Report dated Feb. 9, 2017 in European Patent Application No. 16170734.4 (11 pages).

* cited by examiner

ANOMALOUS PIXEL DETECTION

CROSS-REFERENCE TO RELATED APPLICATIONS

This application claims benefit from U.S. Provisional Application 62/174,400, filed Jun. 11, 2015, entitled DEVICE AND METHOD FOR DEAD PIXEL DETECTION WITH VISUALLY SALIENT PIXEL TRACKING, the contents of which are herein incorporated by reference. This application also claims priority to Indian Provisional application 2011/MUM/2015, filed May 22, 2015, entitled FAST RESIDUAL POINT NOISE DETECTION, the contents of which are herein incorporated by reference.

FIELD OF INVENTION

This disclosure is related to video analysis, and, more particularly, to a device and methods for detecting dead, stuck, or otherwise defective pixels of an image generator or its image or video output.

BACKGROUND

Dead or defective pixels are those pixels in a video clip that consistently stand out from their neighborhood pixels. Defective hot pixels are stuck at the brighter end of the intensity range whereas defective cold pixels are stuck at the darker end of the intensity range, both incapable of properly capturing the scene color. Defective pixels in native camera content usually have very sharp edges, i.e. high contrast with their neighbors. Defective pixels in native camera content may be caused by problems with particular portions of the solid-state imaging sensors, or by dust or dirt on the sensor surface. Sometimes such defective pixels produce intensity levels that are invariant over a series of images or frames, and cause Residual Point Noise (RPN) in a recorded video. Generally, RPN spots include several numbers of dead or destroyed pixels in the horizontal and/or vertical direction that cannot reproduce colors properly. If such video is sub-sampled or processed, the defective pixels are usually blurred and not as sharp as defective pixels from the native camera output.

In theory, the luminance of such defective pixels could be significantly lower or greater than their neighboring pixels. In a dark scene, defective hot pixels may appear significantly lighter than their non-defective neighbors, and, in a bright scene, defective cold pixels may appear significantly darker than their non-defective neighbors. Also, in theory the RGB value of dead pixels never changes and each dead pixel is present from the very beginning of a scene, or shot, to the end of the scene. However, in real-world video clips, and especially video clips for broadcasting purposes, the RGB value of dead pixels could change or appear and disappear during different portions of the video. This may be due to transcoding operations, up-conversion (rescaling) operations or the nature of the video content. This can also occur when a video clip is assembled from more than one source, with one source having a first set of defective pixels and another source having a second set of different defective pixels. In such cases the resultant video may appear to have defective pixels that momentarily appear or disappear. When a video clip with defective pixels is transcoded or up-converted, the interpolated pixels and their neighbors in the resulting video clip are somewhat blurred. The interpolation process is usually a weighted averaging process, i.e. calculated by determining an average RGB value of the neighboring pixels of an interpolated point, and assigning this average value to the interpolated point. Sometimes when the background of the defective pixels are very bright, then the defective pixels are difficult to notice, and may seem to be absent for periods of time.

RPN detection may typically be defined as a spatial-outlier-and-temporal-invariance detection problem. Performing such calculations at every pixel location throughout every location on a video uses unreasonable computational resources, especially in light of the fact that so few pixels are typically defective compared to the large number of pixels in a video, so it is not cost-effective to detect for RPN in such a manner.

Embodiments of the invention address these and other shortfalls of the prior art.

BRIEF DESCRIPTION OF THE DRAWINGS

Reference is made to embodiments of the invention, examples of which may be illustrated in the accompanying figures. These figures are intended to be illustrative, not limiting. Although the invention is described in the context of these embodiments, it should be understood that this description is not intended to limit the scope of the invention to these particular embodiments.

DETAILED DESCRIPTION OF THE INVENTION

The following detailed description will refer to one or more embodiments, but the present invention is not limited to such embodiments. Rather, the detailed description and any embodiment(s) presented are intended only to be illustrative. Those skilled in the art will readily appreciate that the detailed description given herein with respect to the Figures is provided for explanatory purposes as the invention extends beyond these limited embodiments.

Certain terms are used throughout the description and claims to refer to particular system components. In the following discussion and in the claims, the terms "including" and "comprising" are used in an open-ended fashion, and thus should be interpreted to mean "including, but not limited to . . . ." Phrases such as "coupled to" and "connected to" and the like are used herein to describe a connection between two devices, elements and/or components and are intended (unless otherwise restricted specifically) to mean physically, optically and/or electrically either coupled directly together, or coupled indirectly together, for example via one or more intervening elements or components or via a wireless or other connection, where appropriate. The term "system" refers broadly to a collection of two or more components and may be used to refer to an overall system (e.g., a communication system, a receiving system, a testing system, a computer system or a network of such devices/systems), a subsystem provided as part of a larger system, and/or a process or method pertaining to operation of such a system or subsystem.

The invention described herein is explained using specific exemplary details for better understanding. However, the invention disclosed can be worked on by a person skilled in the art without the use of these specific details. The invention can be implemented in hardware and utilizes software applications. Such hardware may be specifically designed Application Specific Integrated Circuits (ASICs), specialty processors, or general purpose processors programmed with software. Other embodiments may include combinations of such hardware and software. Those having ordinary skill in the art are well versed in creating functional devices from the level of disclosure provided herein. Components and devices shown in block diagram are illustrative of exemplary embodiments of the invention and are meant to avoid obscuring the invention. Also, the connections between various elements may not necessarily be direct and the data transfer in between can be subjected to modifications.

References in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
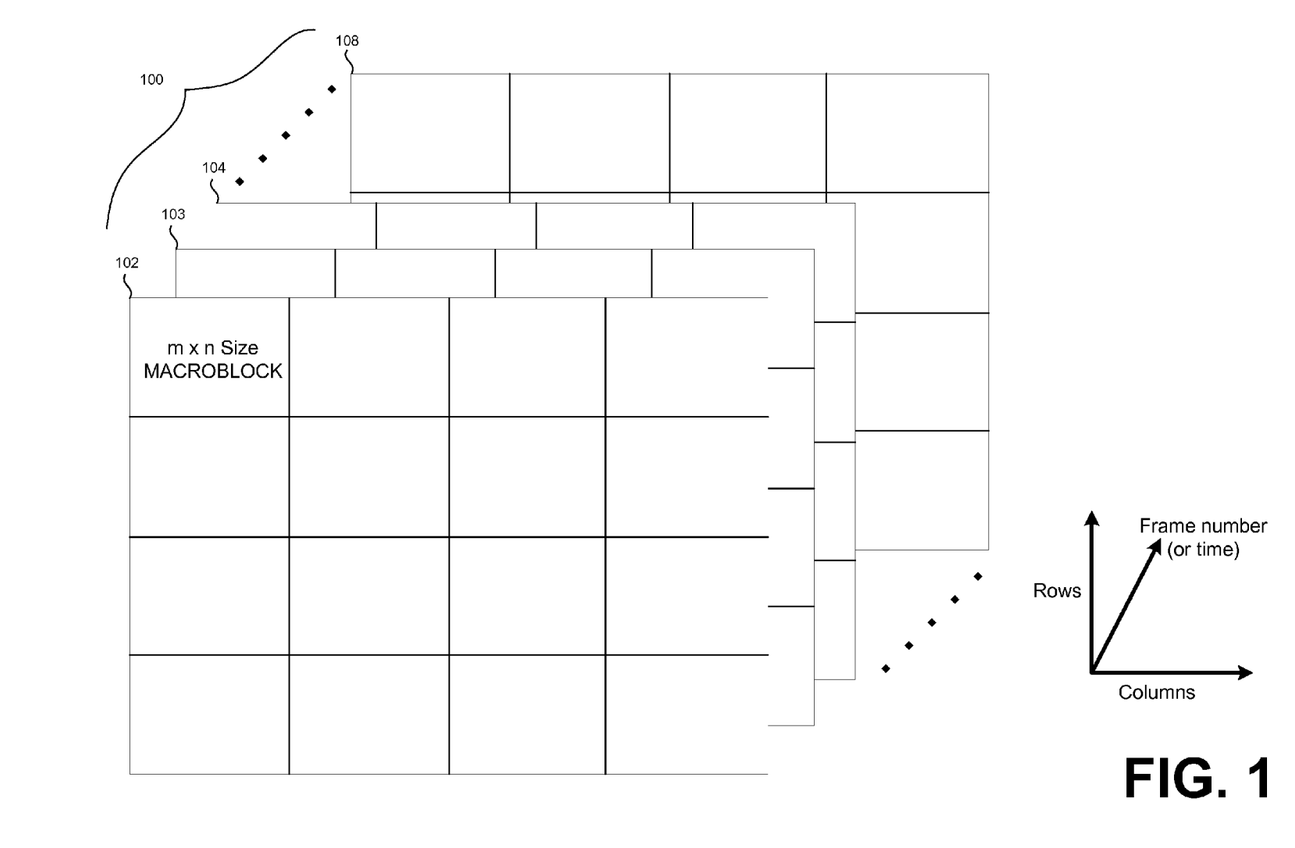
FIG. 1 is a block diagram illustrating a spatio-temporal representation of a video to be analyzed in accordance with an embodiments of the invention.
Figure 2:
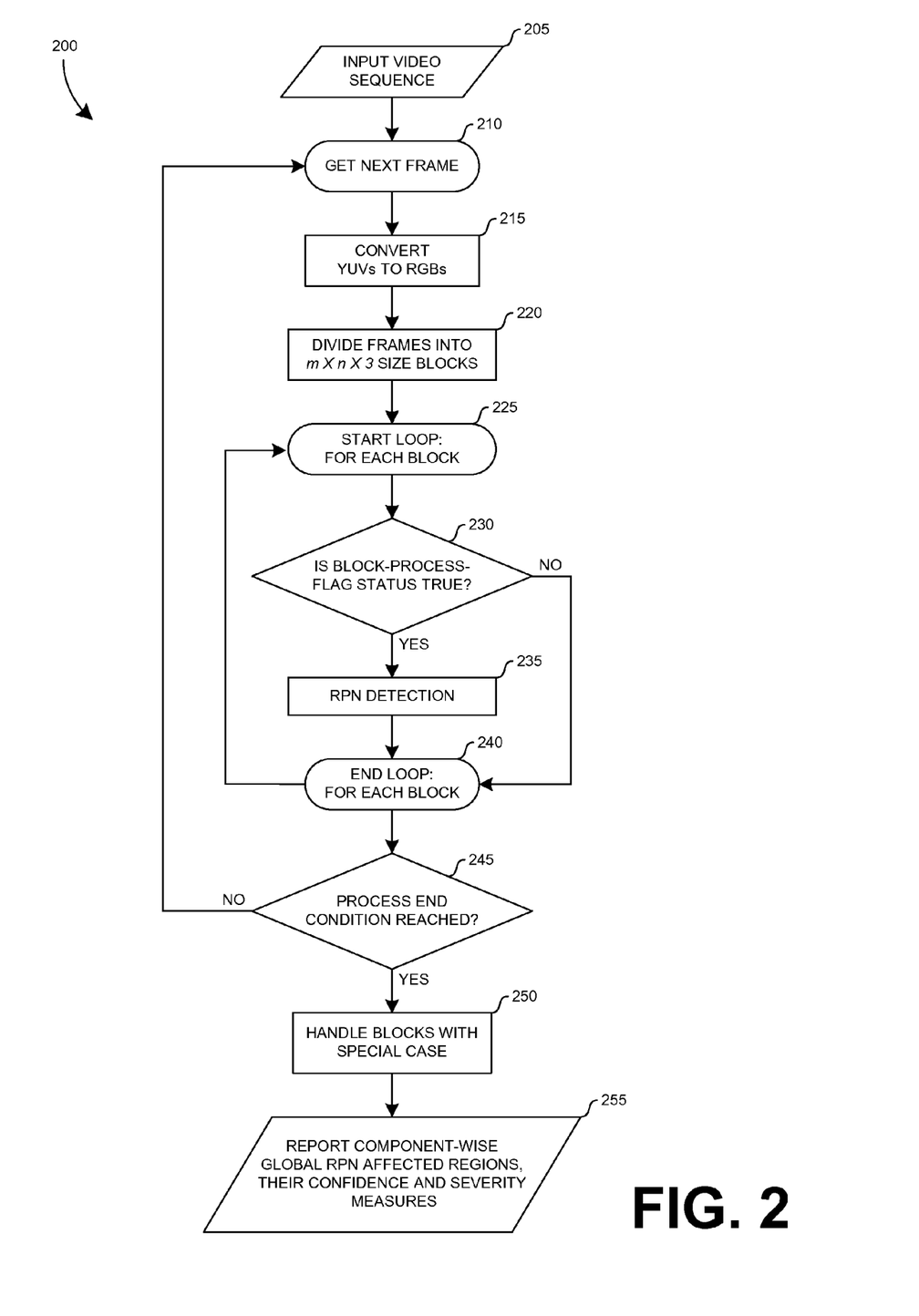
FIG. 2 is an example flow diagram illustrating an example method for detecting residual point noise (RPN) region in a video according to embodiments of the invention.
Figure 3A:
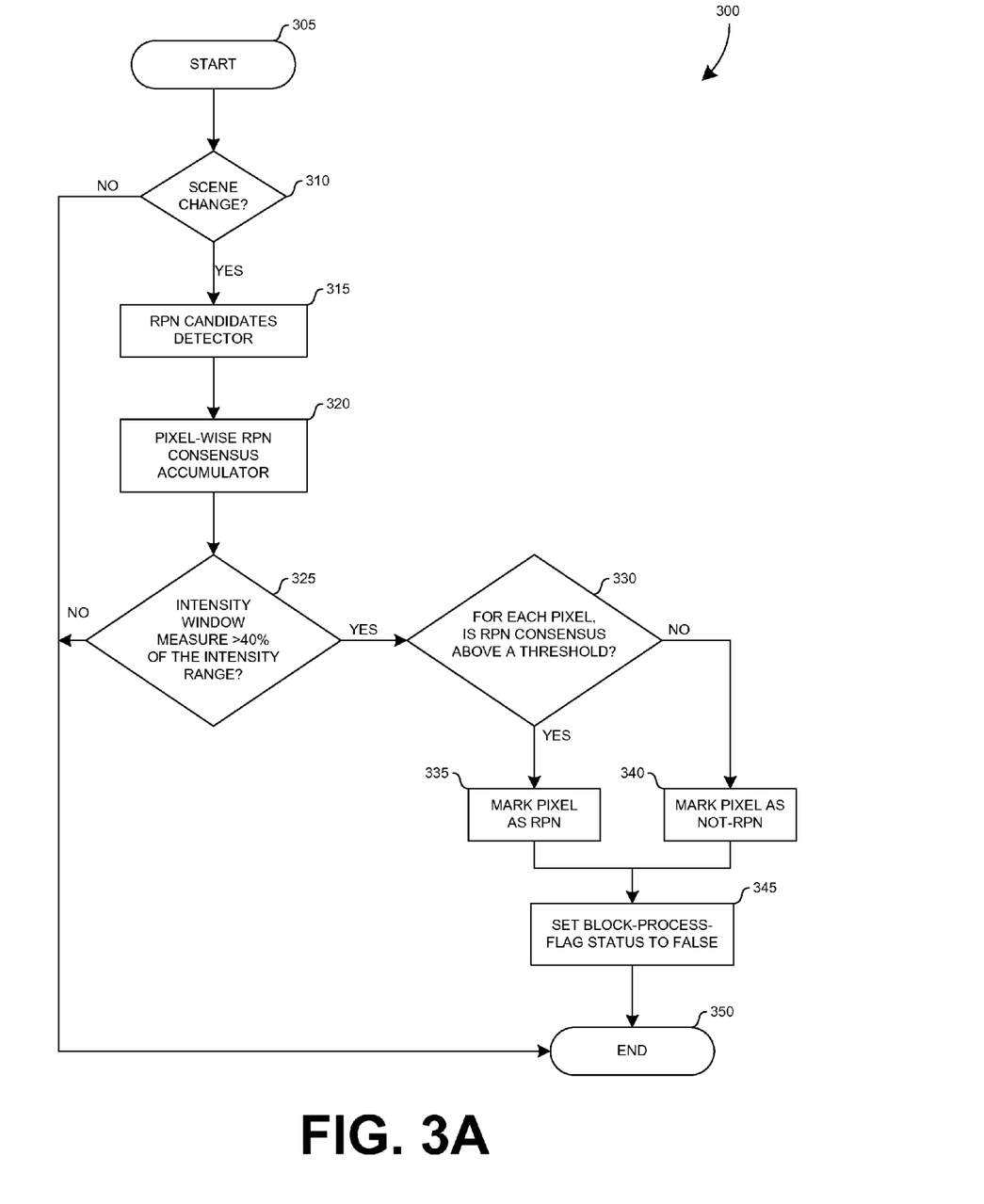
FIGS. 3A and 3B illustrate an example flow diagram of detail steps within the RPN detection system of FIG. 2 in accordance with an embodiment of the invention.
Figure 3B:
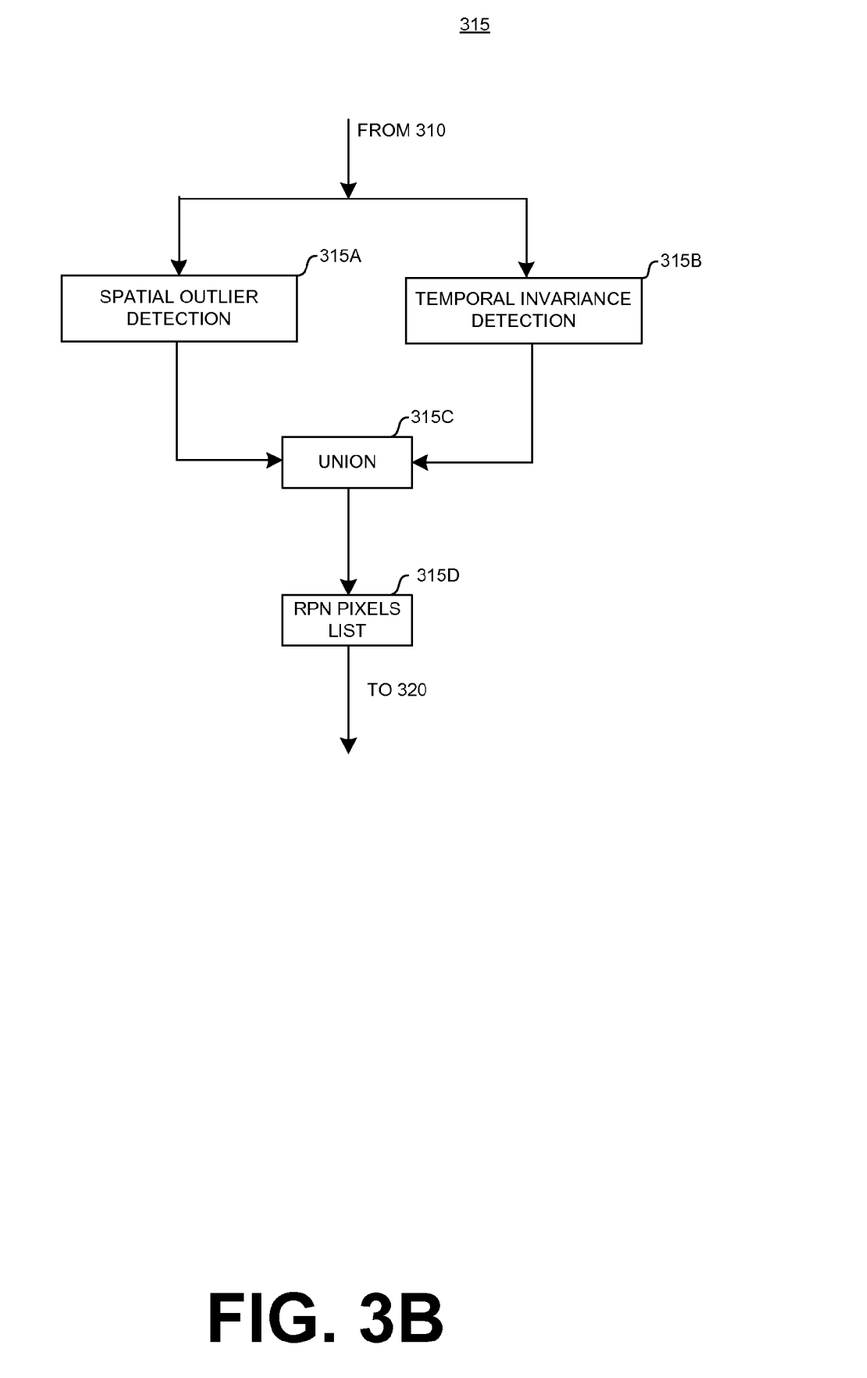
Figure 4:
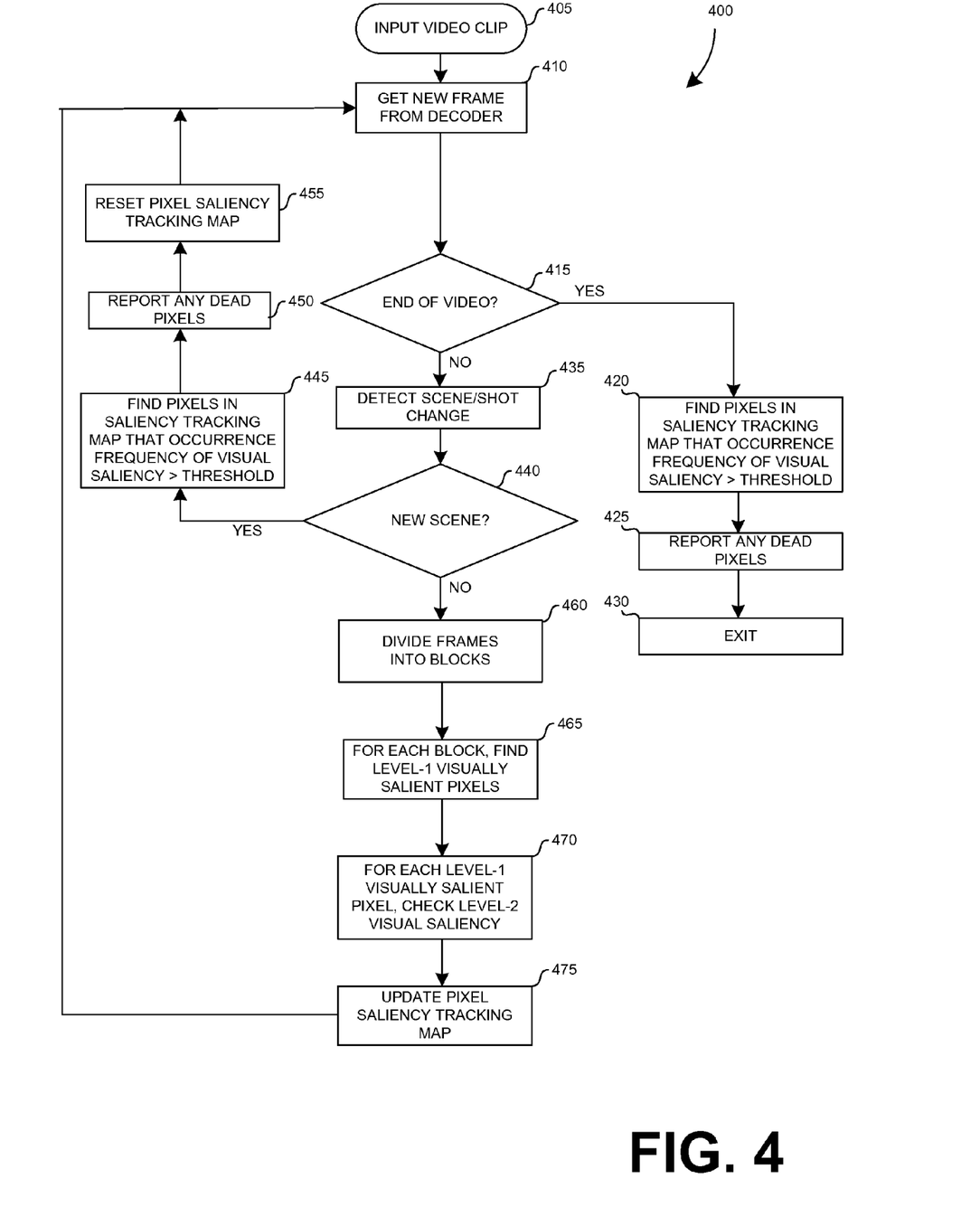
FIG. 4 is an example flow diagram illustrating another example method for detecting defective pixels that can result in residual point noise in accordance with another embodiment of the invention.
Figure 5A:
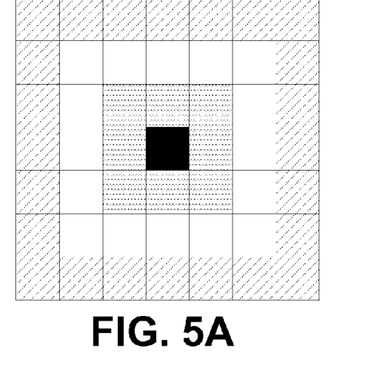
FIGS. 5A, 5B, 5C, 5D, 5E, 5F, 5G, 5H, 5I, and 5J are block diagrams illustrating various layers of pixels for comparison to one or more center target pixels of native camera content, according to embodiments of the invention.
Figure 5B:
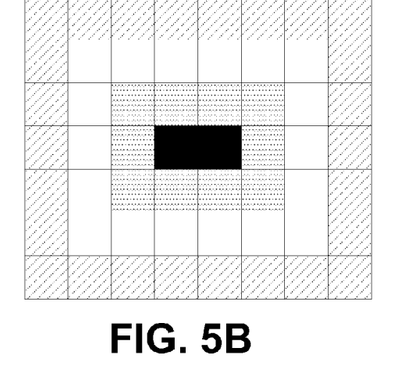
Figure 5C:
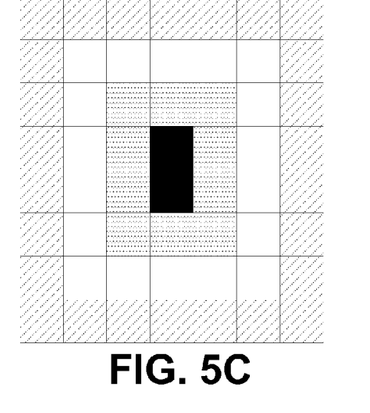
Figure 5D:
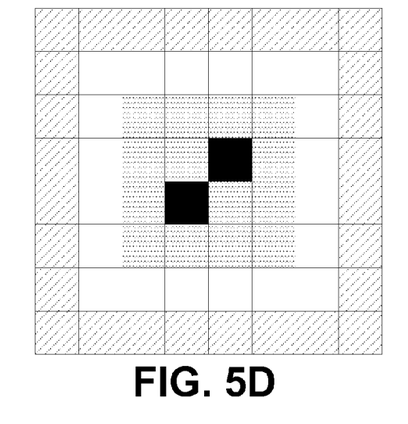
Figure 5E:
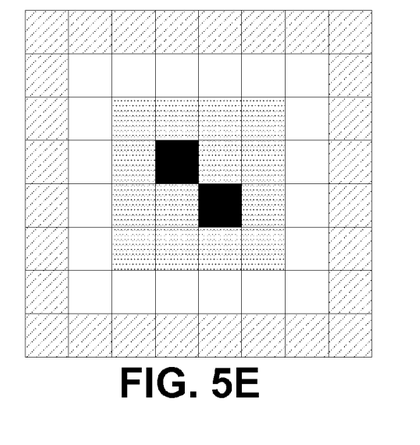
Figure 5F:
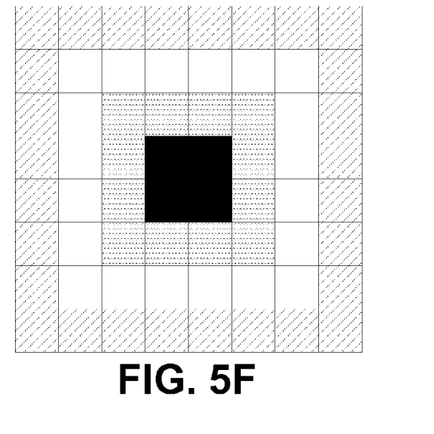
Figure 5G:
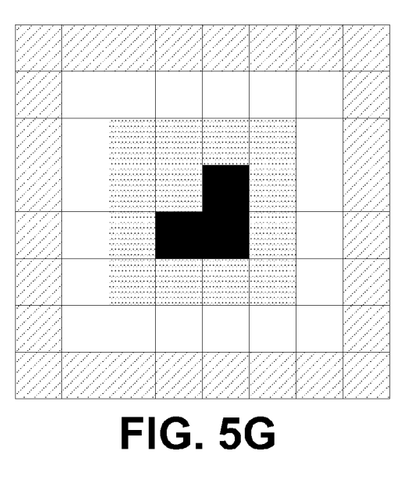
Figure 5H:
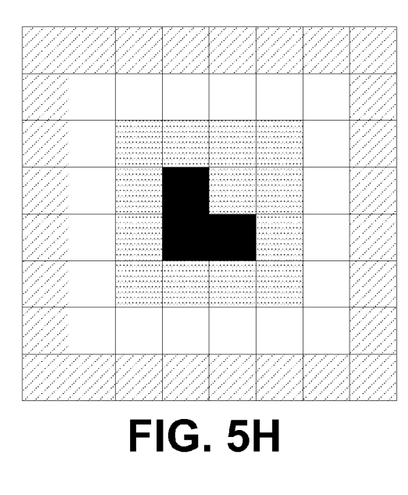
Figure 5I:
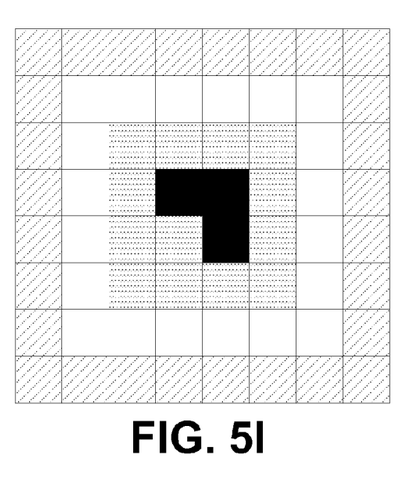
Figure 5J:
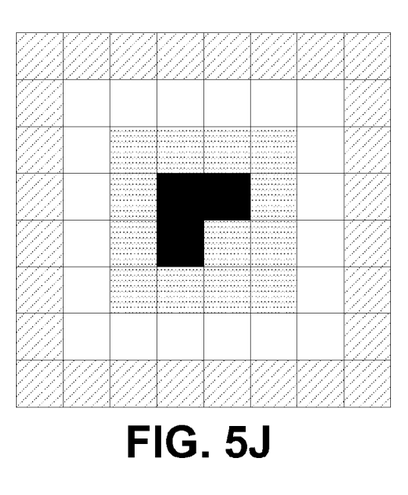
Figure 6:
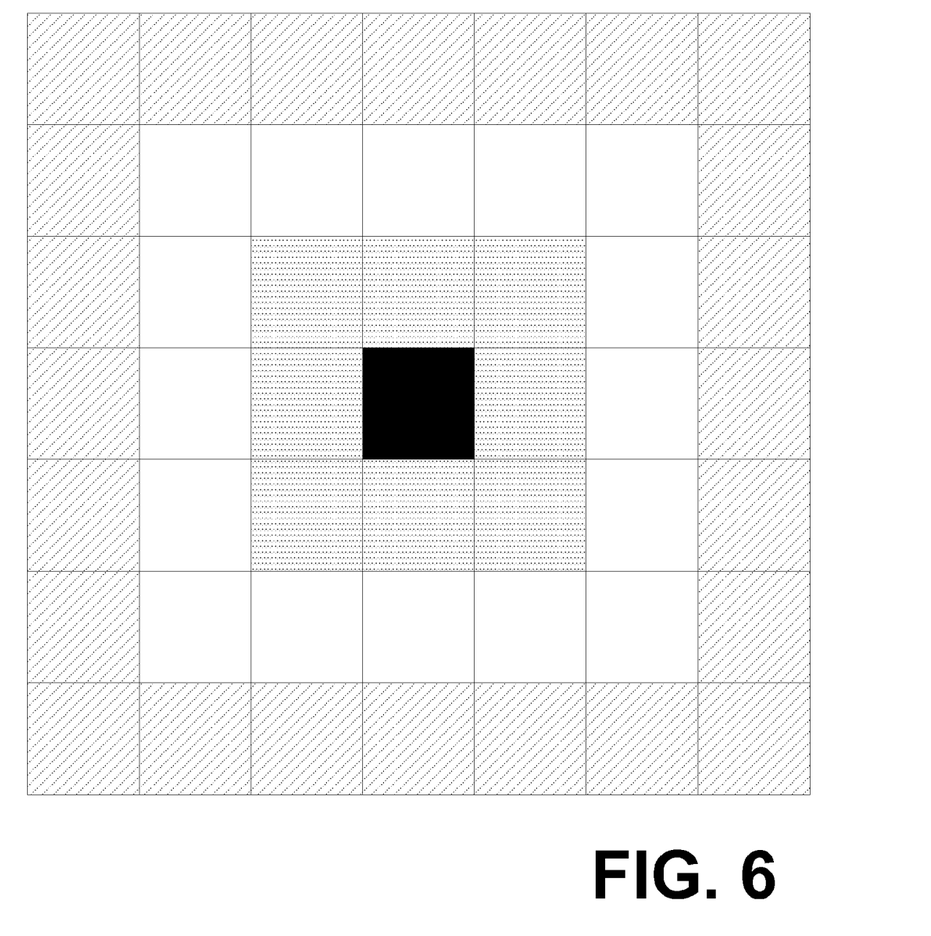
FIG. 6 is a block diagram illustrating various layers of pixels for comparison to a center target pixel of sub-sampled video content according to embodiments of the invention.

A first embodiment of detecting defective pixels using RPN is given with reference to FIGS. 1-3, while a second embodiment of detecting defective pixels is given with reference to FIGS. 4-6.

FIG. 1 is a block diagram illustrating a spatio-temporal representation of a video to be analyzed in accordance with an embodiments of the invention. An example video 100 to be analyzed is made from a number of individual frames 102-108. In actuality the number of frames in the video 100 may include a very large number of frames; the video 100 of FIG. 1 is merely representative. Normally the number of frames per second of video is on the order of 20-300 frames per second, but in certain specialty slow-motion videos may be up to tens of thousands of frames per second. Each frame, for example the frame 102 includes a number of pixels collected into macroblocks. The frame 102 includes sixteen macroblocks, arranged in rows and columns, with each macroblock including a same number of pixels. Typically each block may be 16×16, but other numbers of pixels in a block are possible. It is also possible that there are more columns of macroblocks than rows of macroblocks for a particular frame.

FIG. 2 is an example flow diagram illustrating an example flow 200 for detecting residual point noise (RPN) regions in a video according to embodiments of the invention. The flow 200 commences at an operation 205 by inputting a video sequence, such as the video 100 illustrated in FIG. 1, to be analyzed. Then, in an operation 210 an individual frame from the video is selected, such as the frame 102 of FIG. 1. An operation 215 converts the selected frame from YUV to RGB, if necessary.

Next the frame is divided into macroblocks, also referred to as blocks, in an operation 220, as illustrated in FIG. 1. In some embodiments there may be sets of macroblocks for each color channel, Red, Green, and Blue (RGB), so each color channel is processed and considered independently. Each block location within the established frame is associated with a data structure to store particular data about each block. In other words, the data structure stores data for a particular block location across multiple frames of the video so that particular locations of the frame are evaluated for RPN. For example, the data structure may include a flag indicating whether the block is to be processed, a field to store an RPN confidence measure, a field to store a severity measure, a field to store an intensity window measure, and one or more fields to store a list of pixel locations exhibiting RPN. In some embodiments this data structure is continuously updated and checked as the process continues. Details of populating and using the data structure are set forth below in greater detail.

An operation 225 begins a loop to process each block that first checks status of a block-process flag of the current block, which is originally set to TRUE for all macroblocks. If the block-process flag status for the current block is TRUE, then the block is examined for RPN in an operation 235 as described in more detail with reference to FIGS. 3A and 3B below. If instead the block-process flag status is FALSE, then the flow 200 proceeds to an operation 240, which gets the next block for processing.

Block processing between operations 225 and 240 continues until a process end condition is reached in operation 245. The process end condition may be satisfied if, for instance, the end of the video is reached, or if a user-specified length of video has been processed. The length may be specified in number of frames or time of video, for instance.

An operation 250 handles blocks with special cases. One example of a special case is when the block process flag remains TRUE throughout the entire run length of the video. This could occur when the block is part of a static region of the frame, for example a letter box, pillar box, color bar, black frames or a static scene, for example. It could also remain TRUE when the RPN pixel count dominates the block. In both of these cases, the operation 250 may invoke special processing. In one example of special processing, connected regions of blocks that have TRUE block process flags throughout the length of the video processing are examined. Their total area of such regions is compared to a size of the frame being processed. When the total area of the connected regions of blocks that have TRUE block process flags throughout the length of the video processing falls below 0.01% of the full frame size then, provided no scene change is observed, then the blocks are marked as containing RPN.

Scene changes may be declared to have occurred, for example by tracking the temporal change in mean intensity of the block. If the mean intensity crosses 5% of the intensity range (e.g. 0 to 255 for 8-bit pixel representation), then a scene change is declared.

FIGS. 3A and 3B illustrate an example flow diagram of an example method for detecting residual point noise in accordance with an embodiment of the invention. In other words, some methods of performing the RPN detection in operation 235 of FIG. 2 are illustrated in the flow diagrams of FIGS. 3A and 3B.

A flow 300 begins at a start operation 305, and then proceeds to determine if a scene change occurred, as outlined in detail above, in an operation 310. After the scene change is determined, a process 315 generates candidates for RPN detection, which is detailed in FIG. 3B. A spatial outlier detection process 315A may be RMS (Root Mean Squared) based, or may involve producing a median filtered version and then differencing the present pixel from the filtered version. For example, at any time instance, or frame, each block is assumed to have very little deviation in intensity. Considering a smaller block size will render a pixel exhibiting RPN statistically standing out compared to a small number of neighboring pixels as opposed to when considered as part of a larger neighborhood. Using a smaller block size will likely result in a more accurate spatial outlier detection. One risk of using small block sizes, however, is that the RPN pixels may dominate the statistical properties of the block, especially when, in the rare case, a number of RPN pixels are bunched. Generally, block sizes of 16×16 are used, which is beneficial because that sized block is typical for video compression operations.

Another process 315B uses temporal invariance detection, which is based on temporal difference. Especially at block-level scene changes, there is a likelihood of RPN pixels standing out from its neighbors, so a temporal invariance detection is applied at such instances. In other words, pixels within blocks of frames crossing a scene change boundary are compared to one another, e.g., using a differencing method, and values of zero or close to zero are searched. RPN pixels tend to stand out in scene changes. In other words, the intensity level of such pixels does not substantially change even though many of the other pixels in the block change due to the scene change.

In some embodiments only the candidates that are suspected as being RPN using both the spatial outlier detection method and the temporal invariance detection method are added to the RPN candidate pixel list, as illustrated by operations 315C and 315D. In other embodiments, candidates from either the spatial outlier detection mode or the temporal invariance detection mode may be used, although this method may be less discriminating and may generate a higher number of false positive responses than the former, union, method.

Returning back to FIG. 3A, next a process 320 accumulates data to help determine if a particular pixel within the block is exhibiting RPN. Such data was briefly introduced above, but is explained in more detail herein. An RPN detection confidence measure may be determined for each block by using Equation 1.

$$\text{Max}(1, (\text{Intensity Window Measure}/(\text{Intensity Range} * \text{Intensity Window Threshold}))) \quad \text{Equation 1:}$$

A Severity measure may be determined for each block by using Equation 2.

$$\text{Number of RPN pixels detected}/\text{Number of total pixels in the block} \quad \text{Equation 2:}$$

An Intensity Window Measure may track a dynamic range of mean intensity levels seen by each block during scene changes. If the block is measured to have shown sufficient dynamic range and also has RPN present, then the affected pixels are more likely to be RPN pixels, and flagged as such. One way the intensity window measure may be determined in an operation 325 is to us a difference of temporal maxima and minima of the mean intensity levels computed for a block. A block that has an Intensity Window Measure that is greater than, for example, 40% of the range of intensity levels for that block has its block-process flag set to false in an operation 345.

After the operation 325, the flow continues to an operation 330 where each pixel in the current block is labeled as an RPN pixel in an operation 335 or labeled as not being an RPN pixel in an operation 340. To make such a determination, data accumulated in the data structure is examined and compared to various thresholds. When the data exceeds the threshold, the pixel within the current block is labeled as an RPN pixel in the operation 335, and, when the data does not exceed the thresholds, then the pixel is labeled as not being RPN in an the operation 340. The flow then reverts back to the flow 200 illustrated in FIG. 2. For each pixel identified as being a potential source for RPN, a report is generated in an operation 255 to be output to the user. The report generated by the operation 255 may include the data from the data store described above, including data about pixels identified as having RPN, and/or for each block of pixels. For example, the report may include the list of RPN pixel locations, a severity measure of how many of the pixels in the block exhibit RPN characteristics, an RPN detection confidence measure for each block, and the intensity window measure for each block. Of course, other data generated by the detector system may also be provided to a user.

FIGS. 4, 5A-5J and 6 illustrate another example method for detecting defective pixels that can result in residual point noise in accordance with another embodiment of the invention. As described above, the most important two features of dead pixels include a spatial outlier characteristic and a temporal outlier characteristic. The spatial outlier characteristic exhibits a high contrast between dead pixels and their neighboring pixels, while the temporal outlier characteristic exhibits itself by, for most of the time within a scene, the dead pixels keep present. These two features draw attention of human eyes and are also used to detect dead pixels.

In general, this detection includes identifying some candidate visually salient points, which is referred to as level-1 detection, and then tracking the saliency of the identified pixels throughout the scene, which is referred to as level 2. The tracking result is stored in a tracking map where each pixel of the video frame has an entry. At the end of a shot or scene change, the tracking map is analyzed and the occurrence frequency of visual saliency for each pixel is checked. If a pixel is visually salient for more than, for example 70% of the time in the scene, then it is labeled as a dead pixel. The specific percentage is adjustable depending on operating circumstances, and may be between, for example 40%-90%.

To first generate the level-1 visual saliency, a mean RGB and standard absolute deviation is determined for each block. Unlike the example given above, in this embodiment the RGB channels are combined rather than being considered individually. In one example, the mean RGB of a block or a group of pixels is determined by first summing color values for each channel (R, G, B) respectively to get the sum values sumR, sumG, sumB. Then the sumR, sumG, and sumB values are divided by the total number of pixels within the block or group. Averaging these values gives the mean RGB values. In some embodiments the RGB calculations are performed on pixel values that have been converted to RGB24 or BGR24.

The standard deviation may be calculated using Equation 3.

$$\text{sigma} = \sqrt{\frac{1}{N}\sum_{i=0}^{N-1}\frac{(P_i \cdot R - P_{mean} \cdot R)^2 + (P_i \cdot G - P_{mean} \cdot G)^2 + (P_i \cdot B - P_{mean} \cdot B)^2}{3}} \quad \text{Equation 3}$$

Sigma is a scalar value of the standard deviation. If the standard deviation, sigma, of a particular block is greater than a heterogeneous threshold, then the block may be disregarded because standard deviation above this value likely indicates that the block is in a heterogeneous region of a video frame where the pixels differ significantly from each other. The threshold may be determined empirically. For example, the heterogeneous threshold may be between 24-32, and more particularly 28.

For native camera content, if the standard deviation, sigma, of the current block is less than a level-1 saliency threshold level, such as 20, then a level-1 visual saliency of each pixel in the block is calculated as the absolute deviation of the particular RGB value of the pixel from block mean RGB value. The absolute deviation can be calculated as the difference between the RGB value of the pixel and the block mean RGB using equation 5, set forth below. The level-1 saliency threshold level may be determined empirically, and may range from 15-22, for instance. The actual saliency value may then be rescaled via a thresholding operation against a threshold of, for example, 3 times the block sigma. The rescaling may include driving the sigma level to 16 if it is greater than the level-1 saliency threshold, otherwise driving it to 0.

Next, a difference between the current pixel and its layer-1 neighbors is checked. With reference to FIG. 5A, consider the centermost pixel of this 7×7 block to be the target pixel surrounded by three concentric layers of pixels around it. In this description, the eight pixels immediately surrounding the target pixel are labeled as layer-1, the sixteen pixels immediately surrounding the layer-1 pixels are labeled as layer-2 pixels, and the outermost twenty-four pixels are labeled as layer-3 pixels. Of course, embodiments of the invention work with any block size, and FIG. 5A is just an example. If the target pixel differs significantly, such as by greater than a difference value of 24 from at least five out of its eight layer-1 neighbors then a pattern matching operation may commence. The difference between 2 RGB pixels $P_1$ ($r_1$, $g_1$, $b_1$) and $P_2$ ($r_2$, $g_2$, $b_2$) may be calculated as set forth in Equation 4, and the threshold difference value may be empirically determined.

$$dif(P_1, P_2) = \sqrt{\frac{(r_1 - r_2)^2 + (g_1 - g_2)^2 + (b_1 - b_2)^2}{3}} \quad \text{Equation 4}$$

The patterns to be checked in the pattern matching operation are illustrated in FIGS. 5A-5J. FIG. 5A is described above. The patterns 5B and 5C are made of a block size 7×8, with the two innermost pixels highlighted. The remainder of the patterns 5D-5J are block size 8×8, with two to four innermost pixels in various highlighted combinations. Checking for pattern matching may include several sub-steps. To commence pattern matching, in some embodiments if the saliency of current pixel $P_{cur}$ is greater or equal to 64, then it is ignored because it is already fully processed. Otherwise, each of the layer-1 neighbors are compared to the target pixel using the difference calculation above. If the number of layer-1 neighbors that are significantly different to the target pixel is eight, that means that none of its layer-1 neighbors is "similar" to itself. This, if the eight layer-1 pixels are all significantly different from the target pixel, then it fits the pattern illustrated in FIG. 5A.

If the number of layer-1 pixels significantly different from the target pixel is seven, it means that only 1 of its layer-1 neighbors is "similar" to itself. If the only similar neighbor of the target pixel, labeled $P_{cur}$, is its right neighbor pixel $P_{right}$, and $P_{right}$ differs significantly from all neighbors of $P_{right}$ except for $P_{cur}$, then the group of pixels fits the pattern of FIG. 5B. Similarly, if the only similar neighbor of $P_{cur}$ is its bottom neighbor pixel $P_{bottom}$, and $P_{bottom}$ differs significantly from all neighbors of $P_{bottom}$ except $P_{cur}$, then the group of pixels fits pattern FIG. 5C. This process is continued to determine if a match exists for the patterns illustrated in FIGS. 5D and 5E.

If the number of layer-1 pixels significantly different from the target pixel is six, or five, then the process continues, except that the patterns will match one of the patterns illustrated in FIGS. 5F-5J. So long as the difference is always greater than 24, as described above, then the pattern will match one of the patterns in FIGS. 5F-5J.

If the group of pixels formed by current pixel and its similar layer-1 pixels differs significantly from all the neighbors of this group, then this group is determined to be a level-1 salient pixel group where each pixel is a level-1 salient pixel.

Next, the central target pixel and its similar neighbors form a group of candidate level-1 salient pixels, and the saliency value for this group of pixels is then calculated as the average difference between this group and its layer-1/layer-2 neighbors. This saliency value is rescaled via a thresholding operation against a threshold of 24. If the saliency value is greater than the threshold, then its saliency is set it to 64; otherwise it is set to 0. If the saliency value of the target pixel has already been calculated previously as RGB absolute deviation from block mean, then the larger one of the two rescaled values is considered the appropriate value.

Examining sub-sampled or processed content may use a different technique than examining the native camera content described above, although there are some similarities. In more detail, if the sigma (standard deviation) of the current block of sub-sampled or processed content is less than 20, then level-1 visual saliency of a pixel may be defined as the absolute deviation of RGB value of the pixel from the block mean RGB value, using, for example, Equation 5.

$$\text{deviation} = dif(P_i, P_{mean}) = \sqrt{\frac{(P_i \cdot R - P_{mean} \cdot R)^2 + (P_i \cdot G - P_{mean} \cdot G)^2 + (P_i \cdot B - P_{mean} \cdot B)^2}{3}} \quad \text{Equation 5}$$

Otherwise, if the target pixel differs significantly (difference value greater than 24) from at least 5 out of its 8 layer-1 neighbors as illustrated in FIG. 6, then its level-1 saliency is defined as the average difference between the target pixel and its layer-1/layer-2 neighbors. This may be determined by summing the difference values and dividing that value by the number of summed neighbors.

Unlike the method for native camera content described above, it is not necessary to process a group of pixels at a time even if a candidate pixel has neighbors highly similar to itself. Rather, it is sufficient to rescale the level-1 saliency value.

The native camera content may be handled differently than sub-sampled content with respect to level-1 saliency because in native camera content dead pixels usually have very sharp edges, while in sub-sampled video content they are usually blurred across the edges. The method for native camera content is stricter and thus has lower false positive rate. However, it also may have a lower true positive rate. The method for sub-sampled content is more relaxed in order to catch those blurred dead pixels and thus has higher true positive rate. However, it has higher false positive rate. In some embodiments a user is given at least two options to select. They can select the former technique, regardless of whether native or sub-sampled content is being evaluated, to keep false alarms as few as possible, which could mean missing some dead pixels, or the user can select the latter technique if they want to catch as many dead pixels as possible, with the caveat that there may be an increased rate of false alarms.

After level-1 visual saliency has been performed, a level-2 visual salience is performed.

Level-2 visual saliency is defined as a difference of RGB values between a possible salient pixel region and its nearest neighbors. For a stand-alone candidate salient pixel, a level-2 visual saliency is the difference of RGB values between the target candidate pixel and its layer-1/layer-2 neighbors. For grouped candidate salient pixels, the level-2 visual saliency is the difference of RGB values between candidate pixels and their layer-2/layer-3 neighbors. Calculated saliency values are rescaled against a threshold value of 24 via a thresholding operation described above. One method of calculating the difference of RGB values between two RGB pixels P1 (r1, g1, b1) and P2 (r2, g2, b2) is to use the quadratic mean as set forth above in Equation 4.

Scene (or shot) detection may be performed using PSNR (peak signal-to-noise ratio), SSIM (structural similarity) and affine transformation to detect scene changes. For each frame, first a PSNR is calculated between a current frame, labeled frame A and its previous frame, labeled frame B. If the PSNR value is less than 24, then the SSIM is calculated and an SSIM map is generated as between frame A and frame B. The SSIM map is a matrix of local SSIM values for local 11×11 image patches. Each pixel has a corresponding element in the SSIM map since for each pixel the SSIM is calculated for the 11×11 neighborhood of this pixel. If the condition set forth in Equation 6 is satisfied, then a candidate scene boundary has been found.

(PSNRvalue<PSNR_thres1&&SSIMvalue<SSIM_thres1)||      Equation 6:

(PSNRvalue<PSNR_thres2&&SSIMvalue<SSIM_thres2)||(SSIMvalue<SSIM_thres3)

The following parameter settings for the inequalities in Equation 6 has been proven to work well: PSNR_thres1=14, PSNR_thres2=22, SSIM_thres1=0.64, SSIM_thres2=0.52, and SSIM_thres3=0.35.

If the SSIM_thres1_pct is defined as the percentage of local image patches with a local SSIM greater than 0.98, and SSIM_thres2_pct is defined as the percentage of local image patches with local SSIM greater than 0.85, and if the condition as set forth in Equation 7 is satisfied, then a percentage (denoted by PSNR_thres1_pct) of local image patches with local PSNR greater than 50 is determined.

(SSIM_thres1_pct>0.0001&&SSIM_thres2_pct>0.2)||   Equation 7:

(SSIM_thres1_pct>0.003&&SSIM_thres2_pct>0.17)||

(SSIM_thres1_pct>0.02&&SSIM_thres2_pct>0.15)||

(SSIM_thres1_pct>0.03&&SSIM_thres2_pct>0.12)||
 (SSIM_thres1_pct>0.04)      (3)

If the PSNR_thres1_pct is greater than 0.4, then the likelihood that a scene change has occurred is minimal, and processing the current frame can end. It is likely in such a case that the scene includes fast movements of human figures and/or objects.

If the condition set forth in Equation 7 is not satisfied, or if the PSNR_thres1_pct is not greater than 0.4, then a check is made to determine if there is a fast camera motion going on, which could result in small values of PSNR and SSIM while frame A and frame B are actually within the same scene. To perform such a check, first an optimal affine transformation matrix M between frame A and B is estimated. If the estimation fails, and an empty matrix M is produced, then it is quite likely that a scene boundary has occurred and the processing of the frame is completed. Otherwise, the frame B is warped using the affine transformation matrix M to get a resulting image B'. Then the PSNR and SSIM is computed between current frame A and image B', and the process repeats for frame A and image B'. If the condition of Equation 6 is satisfied and the condition of Equation 7 is not satisfied, then it is quite likely that a scene change boundary has occurred.

After a scene change is detected, the just-completed former scene is processed.

To keep false positive rates low, initially some types of blocks are ruled out. Ruled out blocks include blocks that are frozen for a threshold of time, for example 40%. Also, those blocks with an average neighborhood (kernel size of 9) sigma of their candidate dead pixels is greater than 30 are also ruled out.

To determine blocks frozen for 40% or more of the time in a scene, first the MSE (mean squared error) is calculated in consecutive frames and the MSE values are summed. At the end of the scene the sum of MSE is divided by scene length, in frames, to get an average MSE for each block. If the average MSE of a block is less than 68, it is considered a frozen block. To reduce computing intensity, frozen block analysis is only performed on blocks that contain candidate dead pixels.

To determine whether blocks have an average neighborhood (kernel size of 9) sigma of their candidate dead pixels is greater than 30, the sigma (standard deviation) of the 9×9 neighborhood of the candidate dead pixel is calculated. Again, this analysis may be performed only when a candidate dead pixel is found within a block to reduce resources. Then, for each block, the sigma values are added and, at the end of the scene that sum is divided by the total occurrences of candidate dead pixels within the current block. This average sigma describes the smoothness of the neighborhood of the candidate dead pixels within a block. If it is too large, then the candidate dead pixels within this block are probably in a heterogeneous region.

Finally, the pixels having an accumulated visual saliency occurrence frequency of more than 70% of the scene duration are determined to be defective pixels, and may be reported.

Next, the example flow diagram of FIG. 4 is described for detecting defective pixels that can result in residual point noise. A flow 400 begins at an operation 405 by inputting a video clip for analysis. A new frame is retrieved in an operation 410. If it is not the end of the video as determined in query operation 415, then a query operation 440 determines if the frame is a first frame of a new scene. The query operation may use the techniques described above to make the determination, such as by using PSNR, SSIM and affine transformation techniques.

If the frame is not the start of a new scene, then the frame is divided into blocks in an operation 460. The block size may be different depending on the quality and size of video. For example, for HD and SD video clips and a block size of m×n, m=8 and n=8. For 4K video clips, m=16, n=16. Of course, other block sizes are possible.

For each individual block, first level-1 visually salient pixels are identified as described above in an operation 465. Level-1 salient pixels are taken as candidate visual salient pixels. Then, in an operation 470, for each level-1 salient pixel in each block, a level-2 visual saliency is checked. As described above, level-1 visual saliency is relatively coarse, especially for the method described above with reference to sub-sampled content, and level-2 visual saliency is much finer. In the operation 470, as described above, RGB values of candidate salient pixels are compared to RGB values of their nearest neighbors and the difference is calculated. If the difference is above a threshold, then the saliency is set to 1, and otherwise it is set to 0. The set saliency levels are then used to update a pixel saliency tracking map for each pixel of the block being analyzed.

After the last frame in the scene has been analyzed, the query operation 440 exits in the YES direction, and the pixel saliency tracking map of the last scene is analyzed in a process 445. Defective pixels are reported as error pixels in an operation 450 when their visual saliency occurrence frequency is greater than, for example, than 70% of the scene duration (in frames). If any block is frozen or nearly frozen for more than 40% of the scene duration, or if the average neighborhood (kernel size of 9) sigma of candidate dead pixels within the current block is greater than 30, then the block processing is terminated and the next block is retrieved. After the defective pixels are reported in the operation 450, the pixel map is reset in an operation 455. Then the processing continues to the next bock.

When the last frame in the video has been analyzed, the query operation 415 exits in the YES direction and the same reporting is made for the final shot of the video clip in operations 420, 425, and 430.

Figure 7:
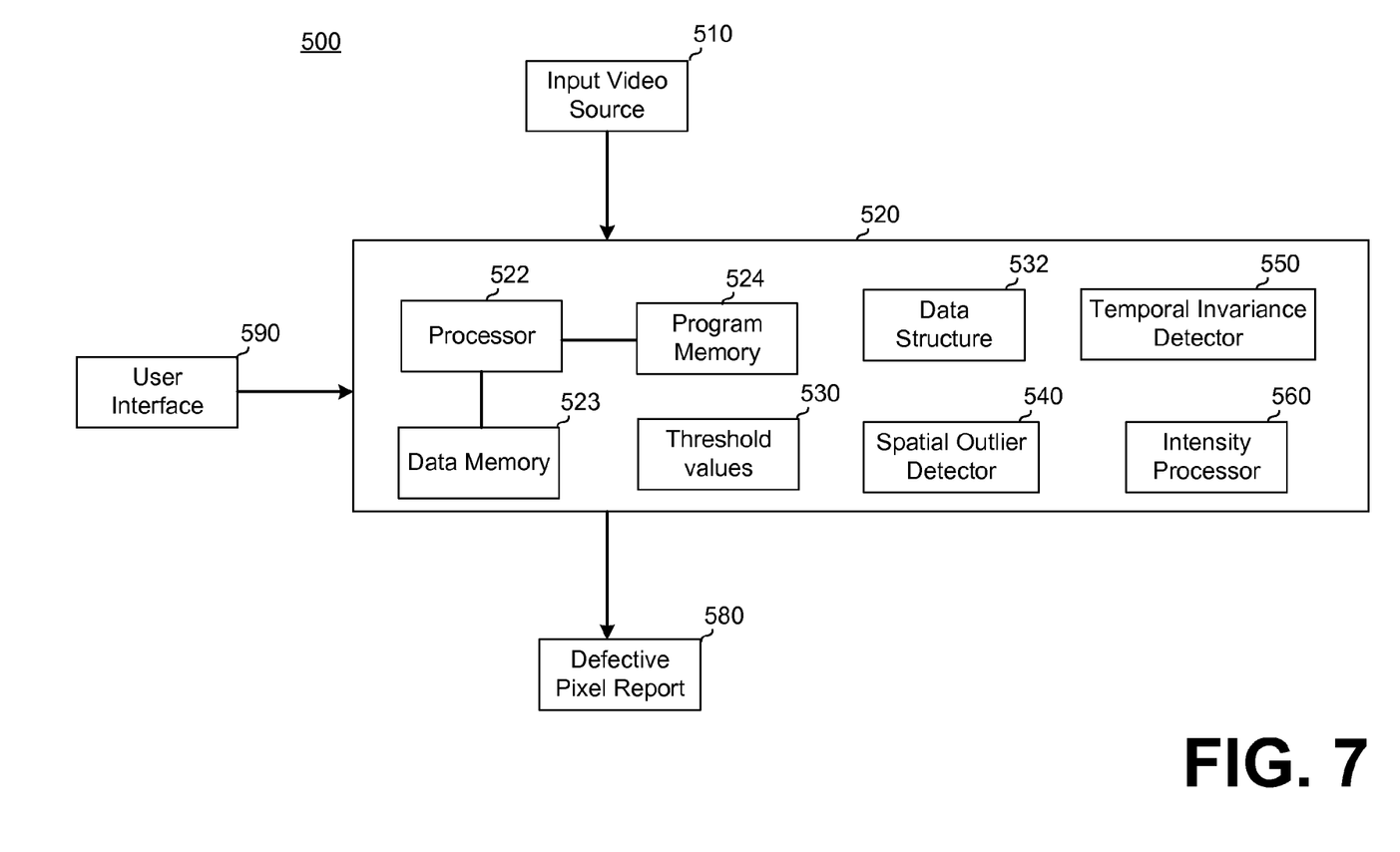
FIG. 7 is a functional block diagram illustrating an example detector according to embodiments of the invention.

All of the embodiments as described above may be embodied in a defective pixel detector, such as the example detector illustrated in the functional block diagram of FIG. 7. A defective pixel detector 520 receives input from a video source 510, and generates a defective pixel report 580 as output. The report may be in various forms, such as a written report, a map of defective pixels, or a list of defective pixels, for example.

In one embodiment the detector 520 includes a processor 522 to perform the operations described above. Data memory 523 and program memory 524 are coupled to the processor 522 and may temporarily store data regarding the defective pixels and/or programs to cause the processor 522 to generate the defective pixel report 580 after it has performed the defective pixel analysis. The pixel detector 520 may also include separate storage for various threshold values 530 and/or a data structure 532 to store block data as described above.

In other embodiments particular functions are performed in specialized hardware, which may be specialized processors or specifically programmed processors. For instance a Spatial Outlier Detector 540 may perform the spatial outlier detection functions described above. A Temporal Invariance Detector 550 may perform the above-described temporal invariance detection. The detector 520 may include other specialized processors as well, such as an Intensity Processor 560, which may perform the intensity window measuring and intensity range processing. The Intensity Processor 560 may also process the intensity window threshold operations.

Although many functional blocks are illustrated in the detector 520, there is not necessarily a one-to-one correspondence between the illustrated functions and physical hardware blocks. Some functions may be performed by the processor 522, or other hardware blocks, or a combination of hardware blocks operating in conjunction with the processor 522.

A user interface 590 allows a user to control the operation of the pixel detector 520, including loading a computer program into the program memory 524, and controlling operation of the pixel detector 520. The user interface 590 typically includes one or more user input devices, such as a keyboard and/or buttons, as well as at least one an output device, such as a display. In operation, a user operates the user interface 590 to commence the defective pixel detection. One or more video sources 510 are selected by the user and the pixel detection operations as described above proceeds using the detector 520 to perform the defective pixel detection operations described above. At the conclusion of the detection operations, or at other times, the pixel detector 520 generates the defective pixel report 530.

It shall be well understood to a person skilled in the art that the invention is not limited to any particular standard or standards, but is applicable to systems having similar architecture without depraving from the inventive scope.

The foregoing description has been described for purposes of clarity and understanding. In view of the wide variety of permutations to the embodiments described herein, the description is intended to be illustrative only, and should not be taken as limiting the scope of the invention. Although specific embodiments of the invention have been illustrated and described for purposes of illustration, various modifications may be made without departing from the spirit and scope of the invention. Accordingly, the invention should not be limited except as by the appended claims.

What is claimed is:

1. A video noise analyzer for detecting residual point noise in a video, comprising:
   an input for receiving a video to be analyzed;
   a temporal invariance detector structured to perform a differencing function between pixels of a same block of two adjacent frames and to generate a first pixel candidate list including pixels that have a relatively low rate of change between frames;
   a spatial outlier detector structured to generate a second pixel candidate list including pixels that have a relatively high level of intensity deviation from adjacent pixels;
   a combiner to combine the first pixel candidate list and the second pixel candidate list to generate a candidate noise pixel list; and
   a data store structured to contain data describing one or more pixels on the candidate noise pixel list or the blocks from which the pixels on the candidate noise pixel list were selected.

2. The video noise analyzer for detecting residual point noise in a video according to claim 1, in which the temporal invariance detector is used when the two adjacent frames span a scene change boundary.

3. The video noise analyzer for detecting residual point noise in a video according to claim 1, in which the spatial outlier detector uses Root Means Squared or a median filter analysis.

4. The video noise analyzer for detecting residual point noise in a video according to claim 1, in which the data store includes:
- a block intensity window measure;
- a block severity measure; and
- a block detection confidence measure.

5. The video noise analyzer for detecting residual point noise in a video according to claim 1, further comprising a color splitter to generate a red component frame of pixel data, a green component frame of pixel data, and a blue component frame of pixel data for each frame input to the video noise analyzer.

6. A method of detecting residual point noise in a video, the method comprising:
- receiving a video to be analyzed;
- performing a temporal invariance detection by performing a differencing function between pixels of a same block of two adjacent frames;
- generating a first pixel candidate list including pixels that have a relatively low rate of change between frames based on the temporal invariance detection
- performing a spatial outlier detection by selecting pixels that have a relatively high level of intensity deviation from adjacent pixels;
- generating a second pixel candidate list including the pixels selected with a relatively high level of intensity deviation from adjacent pixels;
- combining the first pixel candidate list and the second pixel candidate list to generate a candidate noise pixel list; and
- generating a data store structured to contain data describing one or more pixels in the candidate noise pixel list or the blocks from which the pixels in the candidate noise pixel list were selected.

7. The method of detecting residual point noise in a video according to claim 6, in which performing a temporal invariance detection occurs at a scene change.

8. The method of detecting residual point noise in a video according to claim 6, in which performing a spatial outlier detection comprises performing a Root Means Squared function or a median filter analysis.

9. The method of detecting residual point noise in a video according to claim 6, in which generating a data store data store includes:
- generating a block intensity window measure;
- generating a block severity measure; and
- generating a block detection confidence measure.

10. The method of detecting residual point noise in a video according to claim 6, further comprising, for each video frame input to the video noise analyzer, generating a red component frame of pixel data, generating a green component frame of pixel data, and a generating a blue component frame of pixel data.

11. A video noise analyzer for detecting dead pixels in a device by examining video made from the device, the video noise analyzer comprising:
- an input for receiving a video to be analyzed;
- a frame divider to generate a number of blocks of pixels from frames of the input video;
- a first salient analyzer structured to compare pixels within a block to a mean value of other pixels within the same block;
- a first threshold processor to generate a first pixel candidate list including pixels that differ significantly from their neighboring pixels;
- a second salient analyzer structured to, for members of the first pixel candidate list, generate a difference value between a subject pixel, its neighboring pixels, and neighbors of the neighboring pixels; and
- an identifier to label as a candidate dead pixel those pixels having a frequency occurrence of visual saliency greater than a predefined frequency threshold.

12. The video noise analyzer for detecting dead pixels according to claim 11, in which the first salient analyzer is structured to compare pixels within a block only when a standard deviation of a block of pixels is below a predefined heterogeneous threshold.

13. The video noise analyzer for detecting dead pixels according to claim 11, in which the first salient analyzer is structured to operate on combined color channels.

14. The video noise analyzer for detecting dead pixels according to claim 11, in which the labels of candidate dead pixels is reset at a scene change.

15. The video noise analyzer for detecting dead pixels according to claim 11, in which the neighboring pixels includes eight, ten, or twelve pixels.

16. A method for detecting dead pixels in a device by examining video made from the device, the method comprising:
- receiving a video to be analyzed;
- dividing frames of the received video into blocks of pixels;
- performing a first salient analysis to compare pixels within a block to a mean value of other pixels within the same block;
- generating a first pixel candidate list including pixels that differ significantly from their neighboring pixels;
- performing a second salient analysis on members of the first pixel candidate list;
- generating, based on the second salient analysis, a difference value between a subject pixel, its neighboring pixels, and neighbors of the neighboring pixels; and
- identifying as a candidate dead pixel those pixels having a frequency occurrence of visual saliency greater than a predefined frequency threshold.

17. The method for detecting dead pixels according to claim 16, in which performing a first salient analysis occurs only when a standard deviation of a block of pixels is below a predefined heterogeneous threshold.

18. The method for detecting dead pixels according to claim 16, in which performing a first salient analysis comprises performing a first salient analysis on combined color channels.

19. The method for detecting dead pixels according to claim 16, further comprising resetting a list of candidate dead pixels at a scene change.

20. The method for detecting dead pixels according to claim 16, in which the second salient analysis is performed on eight, ten, or twelve pixels.

* * * * *